(12) United States Patent
Greene

(10) Patent No.: US 7,900,436 B2
(45) Date of Patent: Mar. 8, 2011

(54) GAS-GENERATOR AUGMENTED EXPANDER CYCLE ROCKET ENGINE

(75) Inventor: William D. Greene, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 899 days.

(21) Appl. No.: 11/780,626

(22) Filed: Jul. 20, 2007

(65) Prior Publication Data

US 2010/0024386 A1 Feb. 4, 2010

(51) Int. Cl.
*F02K 9/00* (2006.01)
(52) U.S. Cl. .......................... 60/260; 60/257
(58) Field of Classification Search ............ 60/206, 60/257–260, 266, 267
See application file for complete search history.

(56) References Cited

U.S. PATENT DOCUMENTS

| | | | | |
|---|---|---|---|---|
| 3,170,295 | A * | 2/1965 | Dryden | 60/39.48 |
| 4,073,138 | A * | 2/1978 | Beichel | 60/245 |
| 4,185,456 | A | 1/1980 | Cummings | |
| 4,583,362 | A | 4/1986 | Wagner | |
| 4,771,599 | A * | 9/1988 | Brown et al. | 60/258 |
| 4,771,600 | A * | 9/1988 | Limerick et al. | 60/258 |
| 6,052,987 | A * | 4/2000 | Dressler | 60/260 |
| 6,769,242 | B1 | 8/2004 | Balepin | |
| 6,832,471 | B2 | 12/2004 | Hewitt | |
| 6,938,421 | B2 | 9/2005 | Foster-Pegg | |
| 6,968,673 | B1 | 11/2005 | Knight | |
| 7,013,636 | B2 | 3/2006 | Iya et al. | |
| 7,043,920 | B2 | 5/2006 | Viteri et al. | |
| 7,389,636 | B2 * | 6/2008 | Fowler et al. | 60/204 |
| 7,418,814 | B1 * | 9/2008 | Greene | 60/204 |
| 2002/0174659 | A1 | 11/2002 | Viteri et al. | |
| 2004/0128975 | A1 | 7/2004 | Viteri | |
| 2005/0132713 | A1 | 6/2005 | Neary | |
| 2008/0256925 | A1 * | 10/2008 | Pederson et al. | 60/258 |

* cited by examiner

*Primary Examiner* — Michael Cuff
*Assistant Examiner* — Phutthiwat Wongwian
(74) *Attorney, Agent, or Firm* — Anthony Venturino; James J. McGroary

(57) ABSTRACT

An augmented expander cycle rocket engine includes first and second turbopumps for respectively pumping fuel and oxidizer. A gas-generator receives a first portion of fuel output from the first turbopump and a first portion of oxidizer output from the second turbopump to ignite and discharge heated gas. A heat exchanger close-coupled to the gas-generator receives in a first conduit the discharged heated gas, and transfers heat to an adjacent second conduit carrying fuel exiting the cooling passages of a primary combustion chamber. Heat is transferred to the fuel passing through the cooling passages. The heated fuel enters the second conduit of the heat exchanger to absorb more heat from the first conduit, and then flows to drive a turbine of one or both of the turbopumps. The arrangement prevents the turbopumps exposure to combusted gas that could freeze in the turbomachinery and cause catastrophic failure upon attempted engine restart.

16 Claims, 5 Drawing Sheets

GAS-GENERATOR AUGMENTED EXPANDER CYCLE ROCKET ENGINE

ORIGIN OF THE INVENTION

This invention was made by an employee of the United States Government and may be manufactured and used by or for the Government for governmental purposes without the payment of any royalties.

BACKGROUND OF THE INVENTION

1. Field of the Invention

The present invention relates to rocket engines. More particularly, the invention relates to upper stage, restart capable, highly reliable rocket engines.

2. Discussion of the Related Art

Launch vehicles are typically comprised of multiple elements stacked together in stages. There are lower stages and upper stages, with the lower stages being used for lifting the most weight and pushing a vehicle through the thicker layers of lower atmosphere. The upper stages normally fire subsequent to the vehicle traveling very fast in thinner layers of atmosphere and at a very high rate of speed. Accordingly, improvements in upper stage rocket design, even relatively minor improvement can provide a large increase in the performance of a mission.

For example, an improvement in performance for an upper stage can positively affect the amount of payload that a rocket can place into orbit. As a result, some of the most advanced rocket research has focused on upper stages. Although there is no strict definition of an "upper stage," it usually refers to the second, third, and fourth (if any) stages of a rocket, ignited and fired at high altitude.

Space missions require rocket engines that provide high thrust, high efficiency, and robust durability in order to be operated under the demanding conditions of outer space. For example, there are extreme differences in temperature and pressure both during takeoff and in flight.

There have been many attempts to develop high performance and high reliability rocket engines. One such engine is the standard gas-generator cycle, wherein a small fraction of the overall inlet propellant flow is combusted in a secondary combustion chamber, and the product of this combustion is used to drive the turbomachinery directly. These combustion gases are then discharged. Some functioning or past examples of this engine cycle include the J-2 (Saturn V) and the lower stage engine RS-68 (Delta IV).

A concept closely related but more complex than the gas-generator cycle is called the staged-combustion cycle. In this case rather than discharging the combustion gases from the secondary combustion zone, these gases are introduced into the primary combustion chamber and re-combusted. The result is an engine with extremely high performance but also a high degree of complexity. A functioning example of this type of engine is the main engine of the NASA Space Shuttle.

Yet another typical rocket engine cycle proposed for upper stage application is the tap-off cycle, wherein hot combustion products are tapped off from the primary combustion zone and these gases are used to drive the turbomachinery before being discharged, as in the gas-generator cycle. A functioning example of this type of engine, but one that was never actually realized on a rocket vehicle stage is the J-2S developed by the U.S. during the early 1970's.

Finally, the expander cycle rocket engine, which is well known in the prior art, presents an ideal choice for upper stage use. In general, the fuel is heated before it is combusted, typically with waste heat from the main combustion chamber. The expander cycle is based upon the concept of driving the turbomachinery with gases warmed through regenerative cooling of the thrust chamber assembly, so as to eliminate the need for a secondary combustion zone.

The expander cycle rocket engine has many inherent benefits over other typical cycles such as the standard gas-generator cycle, the tap-off cycle, or the staged combustion cycle. In an expander cycle, the fuel is typically heated before it is combusted, the heat being supplied by waste heat from a main combustion chamber.

FIG. 1 is a simplified illustration of a typical expander engine (closed cycle). The heat from the nozzle 105 and the combustion chamber 101 are used to power a fuel pump 115 and an oxidizer pump 120. As the liquid fuel passes through coolant passages 125 in the walls of the combustion chamber 101, the fuel, typically at supercritical pressures, picks up energy in the form of heat. This energy increase within the coolant passages 125 of the walls of the combustion chamber is sufficient to drive the gas turbine 130. The gas turbine provides the power necessary to drive the fuel pump 115 and the oxidizer pump 120. The turbine discharge along with the pumped oxidizer are then provided to the combustion chamber 101 for combustion.

In a closed-cycle expander engine, the exhaust is sent from the turbine to the combustion chamber, whereas in an open-cycle expander engine only some of the fuel is heated to power the turbines, and then vented, resulting in decreased overall efficiency, though this design does have other potential benefits.

Some disadvantages of all of the aforementioned expander cycle engines includes a limit in the amount of available power to drive the turbomachinery because the driving of the turbomachinery is caused by using the heat extracted through the cooling wall of the primary combustion chamber. Attempting to increase the amount of heat transferred can normally be achieved by using extremely thin walls and/or exotic means of increasing the local wall temperature within the combustion chamber.

However, to design a thinner wall or increase the wall temperature causes a reduction of the structural strength of the combustion chamber wall material, thereby reducing the reliability of the component and the engine. Also, typically such engines are shutdown fuel-rich, meaning that the through cooling passages permit cryogenic hydrogen to flow during the shutdown process. Shutting down the engine fuel-rich is standard practice and is intended to establish a benign environment and to avoid a catastrophic failure. However, when this practice is performed in outer space, the hardware and the passages can stay very cold for a long time. Due to the fact that the expander cycle requires heat to initiate and drive the cycle, restarting the engine in this cold state is difficult and unreliable, as it will take some time before the engine has become warm enough to initiate the start sequence.

FIGS. 2 and 3 show an example of one attempt at improving the expander cycle engine as disclosed in U.S. Pat. No. 6,832,471 to Hewitt. Hewitt discloses that by injecting the oxidizer in two streams, with a smaller stream being injected into the upstream or preburner, and the remainder to the downstream or main combustion section, the use of a cooling element with a high intimate heat exchange construction is permitted to extract a high level of energy from the preburner gas in the form of heat without damaging the cooling element.

More specifically, Hewitt discloses a nozzle 11 of an expander cycle supersonic rocket engine. The drawing shows a combustion chamber 13, a throat 17, a supersonic section or skirt 15. The combustion chamber 13 has an upstream or preburner section 21 and a main downstream section 22. The upstream or preburner section 21 is a secondary combustion zone, which is used instead of the more common gas-generator and a main downstream section. In this configuration, the products from the secondary combustion zone are directly fed directly into the primary combustion zone rather than discharged externally.

Still referring to FIGS. 2 and 3, Hewitt discloses that the first portion of liquid oxygen 23 is fed to an inlet torus 24 that surrounds the upstream portion, wherein the torus directs the liquid oxygen through the chamber wall and into the interior of the chamber. The second portion (remainder) of the liquid oxygen is fed to inlet torus 25 and the heated gaseous hydrogen 27 from the turbopump turbine 41 (FIG. 3) exhaust is fed to the preburner section 21 for combustion. A platelet laminate 31 consisting of a laminate of two stacks of circular disks 33, 34, one above the other, separated by a barrier disk 35, is used for heat exchange. The circular disks 33, 34 have central openings 32 and an open space 36 at the stack periphery or by axial channels to form two independent flowpaths that are in heat exchange relationship but not fluid communication. One flowpath is for the combustion gas, and the other is for the uncombusted hydrogen fuel that serves as the coolant.

Still referring to FIGS. 2 and 3, Hewitt discloses the flowpath for combustion gases passes radially outward through the upstream stack 33, then into the annular space 36, then radially inward through the downstream stack 34, then through tubular passages in a distribution manifold 37. The flowpath for the hydrogen fuel acting as a coolant enters the downstream stack 34 upon emerging from the jacket 16, then flows radially inward through the downstream stack 34 (counter-current to the combustion gas) then through axial passages that connect the downstream stack 34 to upstream stack 33, then radially outward through the upstream stack 33 to a space above the upstream stack that leads outwards 38.

The coolant 38 being led outward is now in a gaseous form and directed to the drive turbine 41 of the turbopump (shown in FIG. 3). The heated gas 40 drives turbine 41, which drives two shafts 42, 23 and has separate pumps 44, 45 for liquid hydrogen and fuel. The heated gas 40 pumps fresh coolant to the jacket 16, which flows in the direction indicated by dashed arrows 17,18 while the heated gas itself is expanded and fed 27 to the preburner injector for combustion in the preburner and the main section of the combustion chamber. The partially cooled combustion gas from the preburner 21 is joined by the remainder of the liquid oxygen feed at the downstream face of the injector/manifold 37 to distribute both the fuel-rich preburner gas and freshly supplied oxygen across the width of the combustion chamber. The expanded uncombusted hydrogen 46 that emerges from the drive turbine 41 is then injected into the combustion side of the upstream section 21 of the engine.

Thus, in Hewitt the preburner combustion gas is cooled in a substantially uniform manner to a moderate temperature by cooling the bulk of the gas rather than cooling only the gas in a boundary layer adjacent to the chamber wall.

However Hewitt has disadvantages because the primary and secondary combustion zones are so closely linked. Due to the fact that Hewitt effectively incorporates a staged-combustion element within the expander cycle, this inherently brings into the situation the difficult balancing act of the interplay between the two combustion zones. Hewitt also suffers from some of the disadvantages of the other engines as well.

Other drawbacks of any of the above-mentioned rocket engines, including Hewitt, include the problem that after the engine is shut down, the residual combustion products, specifically steam, can freeze in the injectors and cause damage.

Moreover, for those engine cycles using combustion products as the turbine drive gas, the steam can also freeze in the turbomachinery, which has the potential to be even more disastrous upon attempted engine restart than the potential damage from steam freezing in the injectors. Thus, there is a need in the art for an improved expander cycle rocket engine.

SUMMARY OF THE INVENTION

The present invention provides an improvement over the standard expander cycle engine by including a gas-generator and a close-coupled heat exchanger. The present invention also provides a significant improvement over the pre-burner system as disclosed in Hewitt because by completely decoupling two combustion zones, there is no delicate balance of performance between the two combustion zones. Due to the fact that in the present invention the gas-generator is not directly coupled to the turbomachinery, the possibility that combustion products, specifically steam, can get trapped in the turbomachinery components and preclude the possibility of ice forming in the turbomachinery prior to a subsequent restart of the engine, (which is a potentially catastrophic event) is practically eliminated.

According to a first aspect of the invention, there are two turbopumps, one for liquid hydrogen (for use as a fuel) and one for liquid oxygen (for use as an oxidizer). There is also a thrust chamber assembly within which the primary combustion takes place in order to provide the propulsive discharge of gases. The thrust chamber assembly is made in a manner allowing for fuel to flow interior to the wall, either via tubes or milled channels, thereby providing cooling.

Compared with conventional expander cycle rocket engines, the rocket engine according to the present invention includes a gas-generator comprising a relatively small combustion chamber that is fed propellants (fuel and oxidizer), directly off the two pump discharges. Flow to the combustion chamber is controlled by two valves, one for fuel and one for the oxidizer.

According to the invention, the gas-generator is ignited first, prior to the main combustion chamber, immediately causing heat to be imparted to the coolant hydrogen. The result is that power is more quickly and assuredly delivered to the two turbopumps, thereby ensuring a smooth engine start transient. During regular operation, the gas-generator can be modulated to provide for various levels of engine thrust and can even be extinguished so the engine can function like a typical expander cycle if so desired. For example, a control module (not shown) provides, upon a start or restart, an actuation sequence in which the gas-generator fuel valve and the gas-generator oxidizer valve are actuated open prior to opening the coolant control valve, main fuel valve and main oxidizer valve for igniting the gas-generator prior to igniting the primary combustion chamber. This ignition sequence ensures a smooth engine start transient According to the invention, the turbines of the turbopumps are driven soley by the heated fuel and no combusted gas flows from either the gas-generator or the primary combustion chamber to directly drive the turbines.

In addition, the invention may include a secondary, smaller nozzle to discharge the gas-generator gases, instead of discharging them though the aft end of the first nozzle. The use of a secondary nozzle can provide the function of a settling motor, by using the ignition, initial burning and discharge from the gas-generator as the stage settling thrust, as a small amount of initial thrust is needed to locate the propellants in the proper manner when the engine is started in the zero-acceleration state.

DETAILED DESCRIPTION OF THE INVENTION

The descriptions provided herein in accordance with the drawings have been provided for purposes of illustration and not for limitation. A person of ordinary skill in the art understands and appreciates that there are many variations of the present invention not shown that do not depart from the spirit of the invention and the scope of the appended claims.

Figure 1:
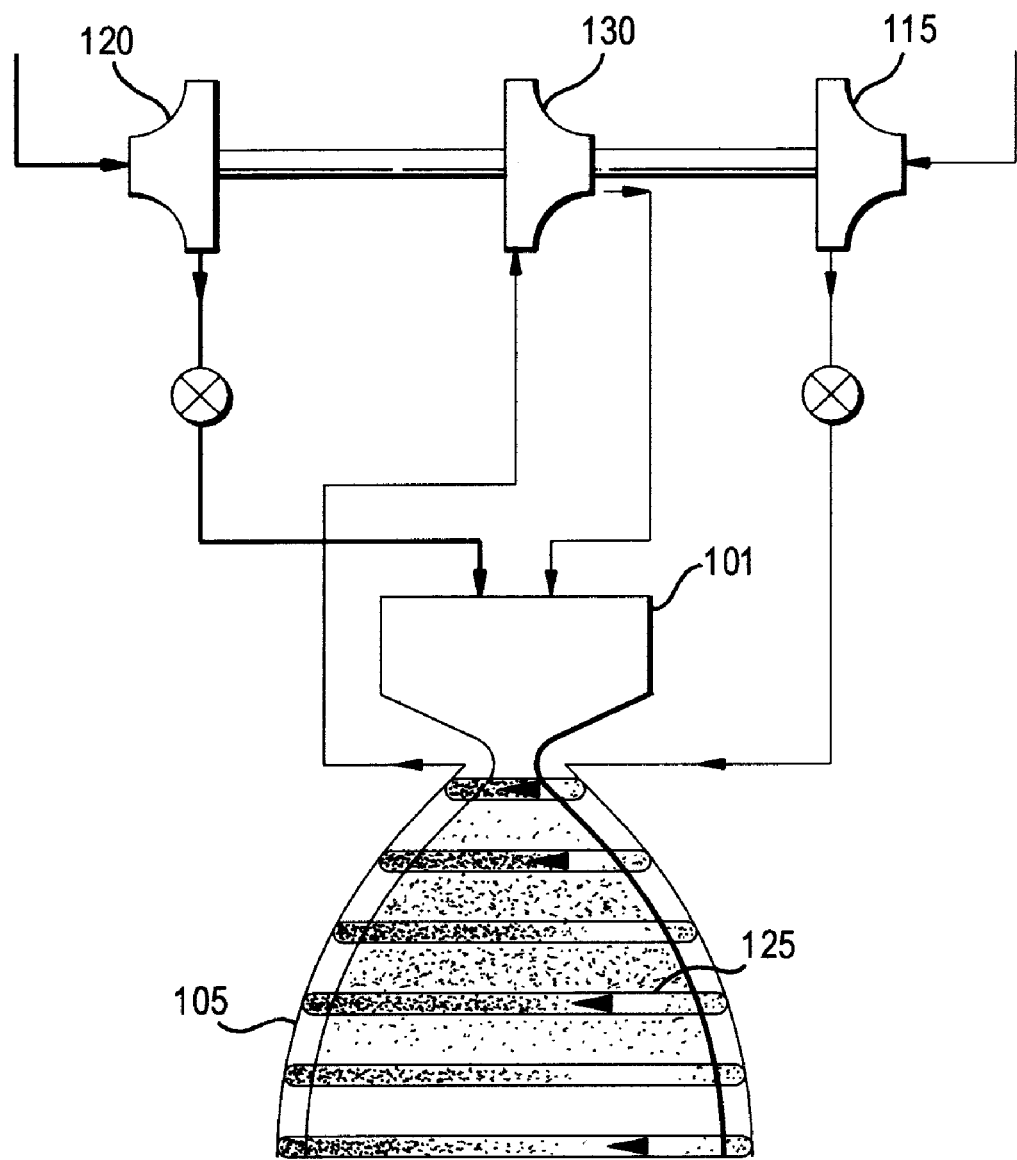
FIG. 1 shows a schematic of one type of known expander cycle rocket engine.
Figure 2:
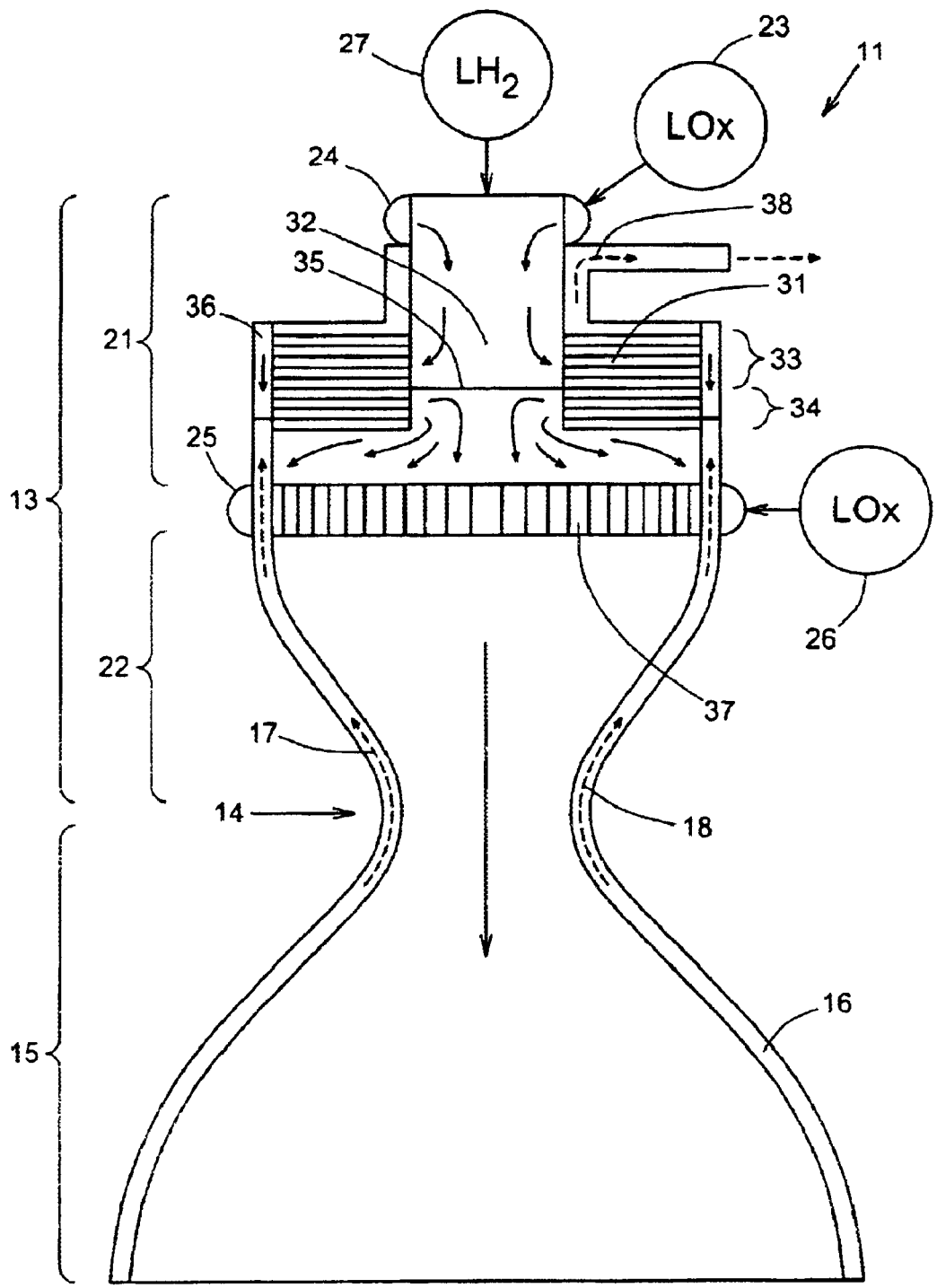
FIGS. 2 and 3 show the nozzle of an expander cycle and a simplified drawing of an expander cycle rocket engine as disclosed by Hewitt in U.S. Pat. No. 6,832,471.
Figure 3:
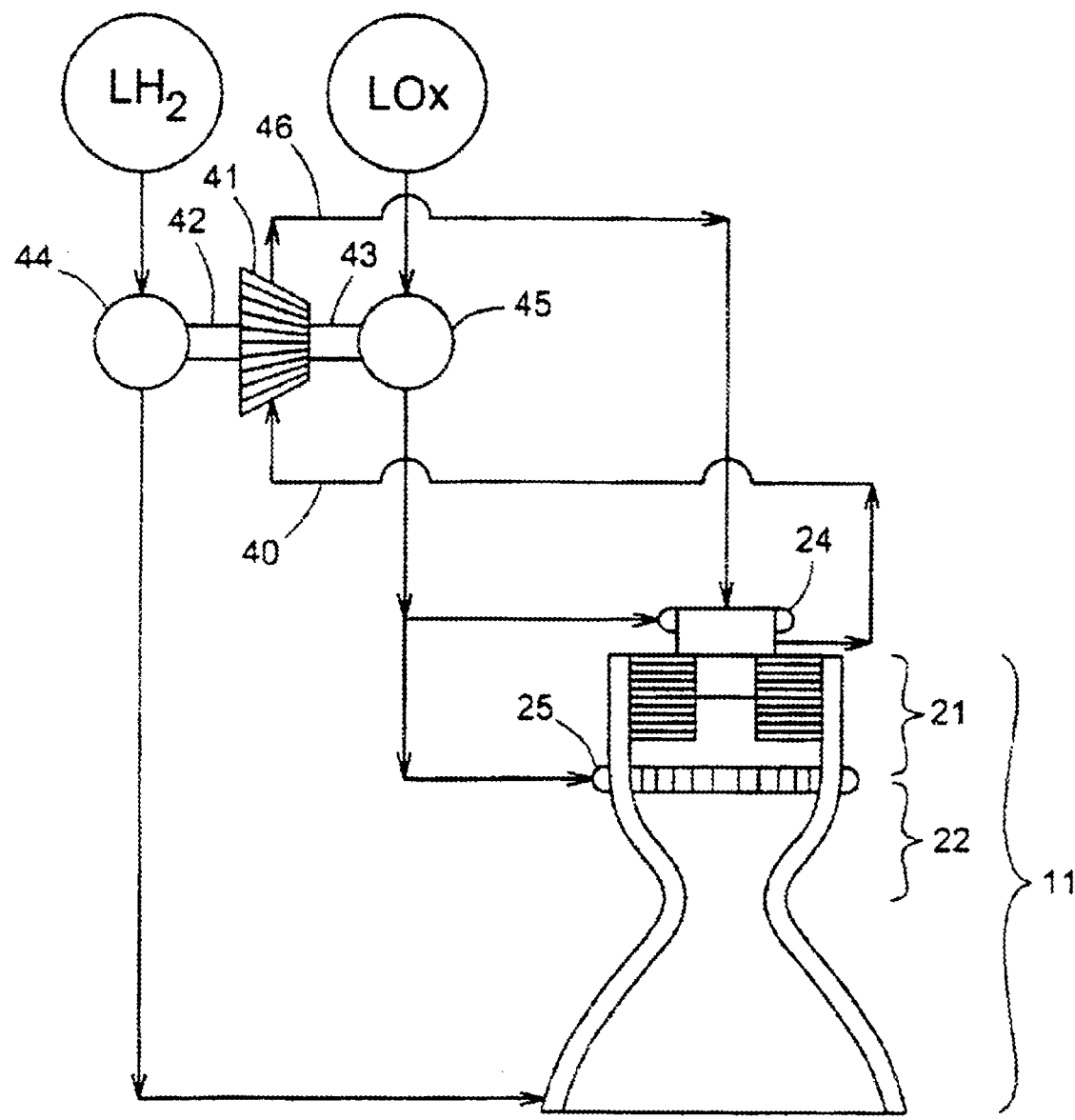
Figure 4A:
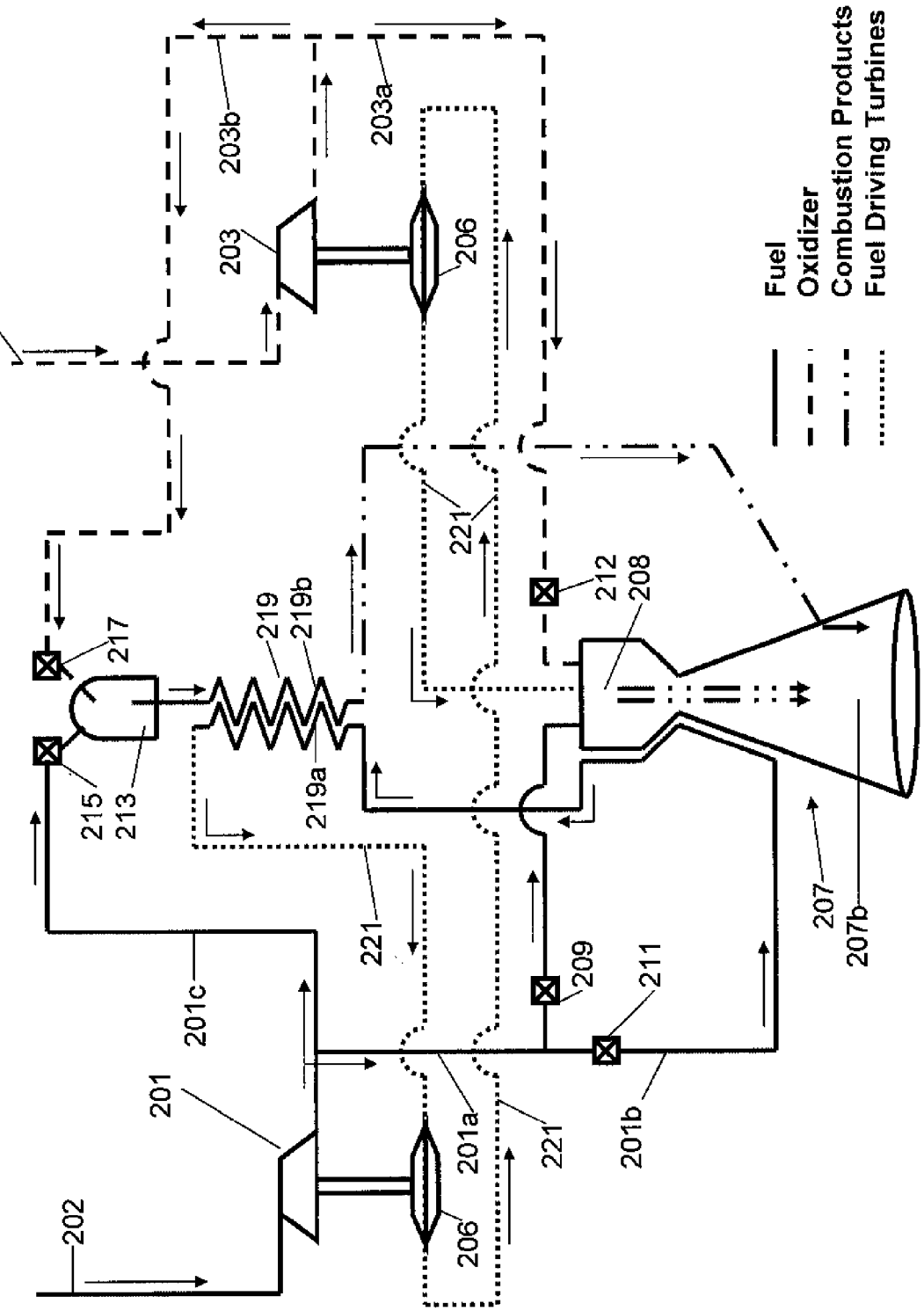
FIG. 4A shows one embodiment of a flow circuit for an expander cycle rocket engine according to the present invention.
Figure 4B:
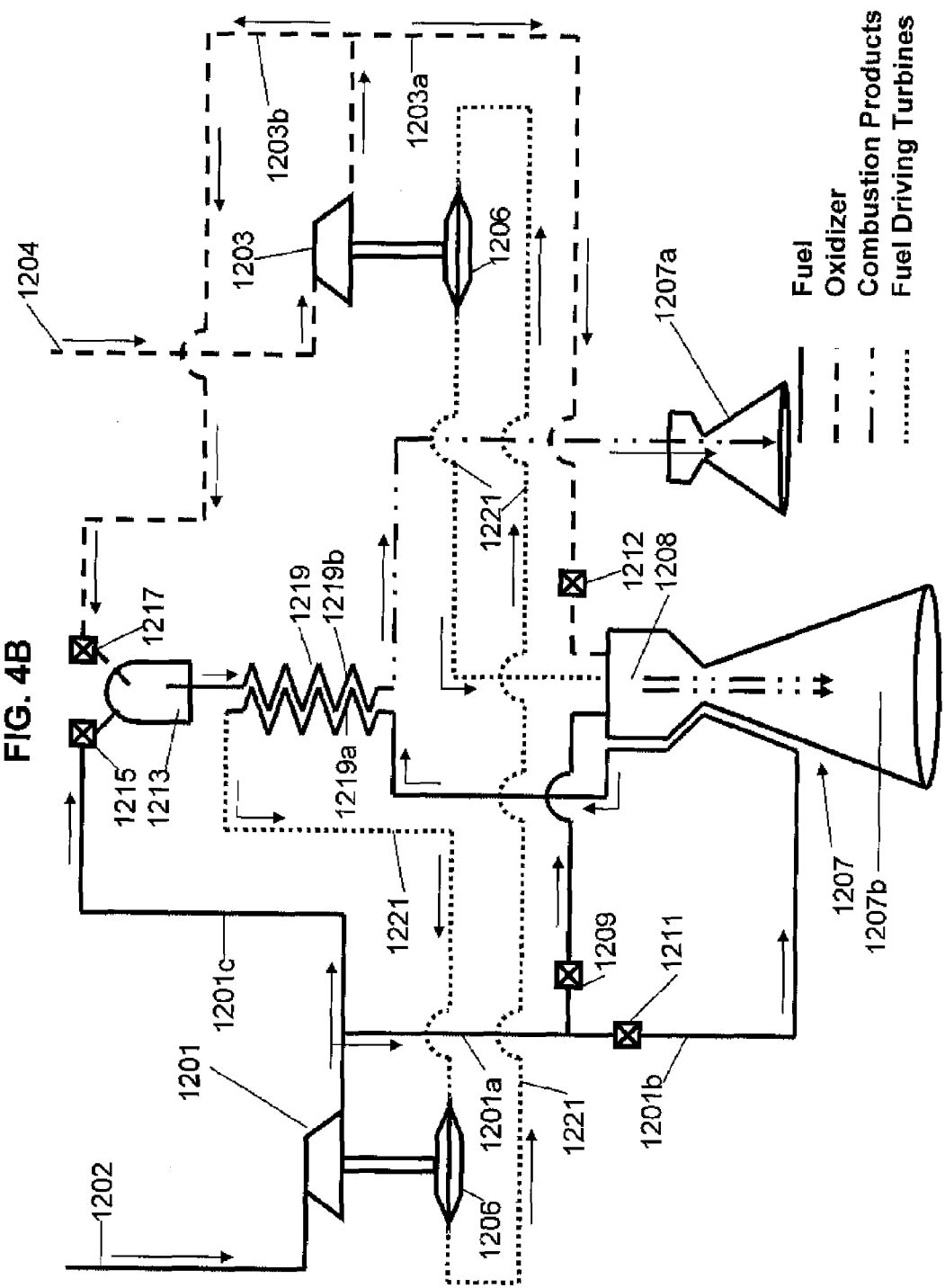
FIG. 4B is variation of the embodiment of the flow circuit shown in FIG. 4A.

FIG. 4A is a simplified view of a first embodiment of a gas-generator augmented rocket engine according to the present invention. A person or ordinary skill in the art understands that the flow circuit shown in FIG. 4A is simplified so as not to obscure the invention with unnecessary detail. There are also a number of valves, ancillary lines, and by-pass pathways most of which are not shown on the diagram, but could typically be included. FIG. 4B uses the same reference numerals except they are increased by 1000, and indicates the same components as their counterparts in FIG. 4A, except for the second nozzle, which is different.

With reference to FIG. 4A, turbopumps, 201,203, which are a combination of a pump and a turbine on either end of a common shaft, are used. A first turbopump 201 provides liquid hydrogen (fuel), and a second turbopump 203 provides liquid oxygen (oxidizer), both of which are stored in the vehicle stage and delivered to the engine through two separate feedlines 202,204. Through the pumps, the propellants are raised to higher pressure to be able to traverse the rest of the cycle.

The thrust chamber assembly 207 has at its forward or upstream end the primary combustion chamber 208, within which the primary combustion of the fuel and oxidizer takes place to provide the propulsive discharge of hot gases. At the rearward end or downstream end is a nozzle 207b, by which the gases are discharged to propel the rocket.

The thrust chamber assembly 207 is made in a manner to allow for coolant in the form of fuel to flow interior to the wall, either via tubes or milled channels, thereby providing cooling to the hot gases in the combustion chamber. This transfer of heat is also desirable because it is desired to heat the fuel used to drive the turbines.

On the fuel side 202, some propellant 201a is directed straight to the primary combustion chamber 208 of thrust assembly 207 through a fuel output conduit via the main fuel valve 209. However, a fraction 201b of the fuel is flowed through the walls of the combustion chamber via coolant control valve 211 for the dual purpose of cooling the primary combustion chamber assembly 208 of thrust chamber assembly 207, and for the fuel to pick up energy in the form of heat. This same heated fuel then passes through first conduit 219a of heat exchanger 219 and is additionally heated by the gas discharge in second conduit 219b. The heated fuel exits and follows path 221 to power the turbines 206 of both turbopumps 201, 203. When the turbines are driven, the turbo pumps can provide more fuel and oxidizer to the primary combustion chamber 208.

As an additional element heretofore unknown, another fraction 201c of the fuel pump discharge is conducted to the gas-generator 213. The gas-generator 213 is a small combustion chamber fed by propellants (the liquid hydrogen and liquid oxygen fuel from turbopumps 201, 203), which pass through respective gas-generator fuel and oxidizer valves (215, 217) that may include actuators to control the type and quantity of combustion gas output from the gas-generator 213. Immediately downstream of the fuel and oxidizer valves is the heat exchanger 219 comprised of numerous tubes situated cross-wise to the hot gas flow and allowing fuel to flow within and become heated. For simplicity purposes, FIG. 4A shows a non-limiting example in which first conduit 219a and second conduit 219b are used for heat exchange.

The fuel following path 201b is used to cool the thrust chamber assembly 207 (via coolant control valve 211) and then after exiting the primary combustion chamber 208 of the thrust chamber assembly 207 the heated fuel flows through the first conduit 219a of the heat exchanger 219 situated downstream of the gas-generator 213. In this way, the fuel in path 201b, which already has received heat while being used to cool the thrust chamber assembly 207, receives even more energy in the form of heat in the heat exchanger 219 from the heated gas discharge leaving the gas-generator 213. The fuel, which has now been heated by both the transfer of heat from primary combustion chamber 208 and the heat exchanger 219, now can power the turbines 206 with more energy and reliability than in rocket engines previously known.

Still referring to FIG. 4A, after passage through the second conduit 219b in the heat exchanger, the discharged gas from the gas-generator 213 is typically introduced to the aft end 207b of the nozzle in the thrust chamber assembly 207.

On the oxidizer side 204 of the flow circuit, the layout is somewhat less complex. Liquid oxygen enters the engine, is pumped by turbopump 203 to a higher pressure, and then the majority of the liquid oxygen is then conducted directly through output conduit path 203a via valve 212 to the primary combustion chamber 208 within the thrust chamber assembly 207. A small fraction of the liquid oxygen is tapped off via path 203b to provide oxidizer for the combustion within the gas-generator 213.

Still referring to FIG. 4A, the use of the gas-generator 213 and close-coupled heat exchanger 219 permits the heating of the fuel that powers the turbines of the turbopumps to a higher temperature than in typical expander cycle rocket engines and other known engines including those previously discussed, permitting the turbines to receive a transfer of power faster and at a higher level than known heretofore. It should be noted that the turbines 206 are driven only with heated fuel, and not combustion gas, as the combustion gas discharged from gas generator 213 travels through second conduit 219b and then to the aft 207b of the nozzle for discharge. Accordingly, the turbines will not be subjected to steam that would be present in the combustion gas, and thus when the engine is turned off, there would not be a possibility of ice forming in the turbo-machinery as in several rocket engine cycles known heretofore.

In operation, the gas-generator 213 would be ignited first causing heat to be immediately imparted to the coolant hydrogen that passes through the walls of the combustion chamber of the primary combustion chamber prior to entering the heat exchanger. The result is that power would be delivered more assuredly and faster to the turbine ends of the two turbopumps 201, 203, thereby ensuring a smooth engine start transient.

In addition, one advantage of the invention is that additional heat transfer is obtained by decoupling the heat exchanger from the thrust chamber assembly, thereby overcoming the limitations of known rocket engines using regenerative cooling for providing power to the two turbopumps 201, 203. During the engine start transient, the structure of the present invention allows for a more regular, repeatable, and therefore reliable engine start, even when the thrust chamber assembly hardware has little latent heat. During regular engine operation, this decoupling allows for the thrust chamber walls to be kept at more regular temperatures, thereby allowing them to maintain their structural strength and thus increase engine reliability.

Moreover, another advantage of the present invention over rocket engines known heretofore is that an output of the gas-generator does not directly drive the turbomachinery. As a result, no combustion products from the gas-generator, such as steam, can get trapped in the turbomachinery components. This invention eliminates the possibility of forming from trapped combustion products in the turbomachinery prior to the next restart of the engine. Such ice can cause catastrophic results.

A person of ordinary skill in the art also will appreciate and understand that the simple injector included as part of the gas-generator according to the present invention would be relatively easy to purge of combustion products in comparison to turbomachinery. Also, depending on the operational needs of the rocket engine stage, it may be possible to run the gas-generator at very low total flow rates or even extinguish it altogether to achieve a higher level of overall engine performance than is possible with tap-off or gas-generator rocket engine cycles.

During regular operation, the gas-generator 213 can be modulated by variably actuating the gas-generator fuel valve and/or the gas-generator oxidizer valve so as to provide various levels of engine thrust, or even be extinguished.

One possible variation of the present invention, as shown in FIG. 4B, would be that instead of discharging the gas-generator through the aft end 1207b of the nozzle 1207, a second smaller nozzle 1207a can be added to discharge these gases. Such a secondary nozzle 1207a has been used in the past on some gas-generator cycle engines, but not with a gas generator augmented expander cycle rocket engine according to the present invention. In configuring the engine as shown in FIG. 4B, the secondary nozzle discharge could function in the capacity of a "settling motor". As the engine is typically started in a zero-acceleration state, in order to locate the propellants in the proper manner within the vehicle stage, a small amount of initial thrust is needed. Thus, the addition of the secondary nozzle could be used to eliminate a typical additional system on the vehicle stage that performs the settling function.

In addition, another one of the many variations of the present invention can be to use a slightly more complex engine cycle than that shown in FIG. 4A or FIG. 4B. Specifically this would involve the use of a kick pump, a secondary pump on the same shaft, on the fuel side of the flow circuit. Such an arrangement allows for more efficient utilization of overall turbopump power, though it does raise the complexity level of the configuration.

A person of ordinary skill in the art understand and appreciates that the foregoing examples were provided for illustrative purposes and are not the only ways the present invention can be configured. For example, while FIG. 4A shows the heated fuel drives the turbopumps, there is no requirement of exclusivity. Of course, the introduction of even small amount of combusted gas to the turbomachinery could create the catastrophic conditions previously discussed. There could also be more than heat one exchanger, a plurality of conduits giving and receiving heat, and it is possible that some or all of the fuel flows depicted could be reversed through the combustion chamber and/or heat exchanger.

I claim:

1. A gas-generator augmented expander cycle rocket engine, comprising:

a first turbopump for pumping fuel, said first turbopump comprising a shaft having a pump at a first axial end and a turbine at a second axial end;

a second turbopump for pumping oxidizer, said first turbopump comprising a shaft having a pump at a first axial end and a turbine at a second axial end;

a gas-generator adapted for receiving a first portion of fuel output from said first turbopump and a first portion of oxidizer output from said second turbopump and ignite to discharge a heated combustion gas;

a heat exchanger arranged downstream of said gas-generator, said heat exchanger being close-coupled to said gas-generator and having a first conduit for receiving a heated output of combustion gas from said gas-generator, and a second conduit for transferring heat arranged adjacent to said first conduit;

a thrust chamber assembly comprising a primary combustion chamber at a forward facing end and a nozzle at a rearward facing end, said thrust chamber assembly having walls with a plurality of cooling passages therein for receiving a second portion of fuel output from said first turbopump and transferring heat to the second portion of the fuel passing through the cooling passages to cool said thrust chamber assembly, wherein said cooling passages and an input of the second conduit of the heat exchanger are in communication for discharging the second portion of fuel from the cooling passages into the input of the second conduit of said heat exchanger to further heat the second portion of fuel;

wherein said second conduit is in communication with at least one flow path in fluid communication with a turbine of one or both of said first turbopump and said second turbopump for discharging said second portion of fuel from said second conduit into the at least one flow path in fluid communication with the turbine of one or both of said first turbopump and said second turbopump, and for driving the turbine of one or both of said first turbopump and said second turbopump by the second portion of the fuel heated by passage through the second conduit of said heat exchanger and not exposing said first turbopump and said second turbopump to combusted gas from either the gas-generator or the primary combustion chamber; and a fuel output conduit for passing a third portion of said fuel output from said first turbopump, and an oxidizer output conduit for passing a second portion of oxidizer output from said second turbopump into the primary combustion chamber of said thrust chamber assembly, for forming combustion products for discharge from the nozzle of said thrust chamber assembly to provide thrust to propel the rocket.

2. The rocket engine according to claim 1, wherein said at least one flow path for receiving the discharge of the second portion of fuel from said second conduit comprises a single flow path for exclusively driving the turbines of one or both of the first and second turbopumps.

3. The rocket engine according to claim 1, wherein the first conduit is in communication with an aft end of the nozzle of the thrust chamber assembly for discharging heated gas from said-gas generator.

4. The rocket engine according to claim 1, further comprising a secondary nozzle for providing settling thrust, said secondary nozzle being relatively smaller than the nozzle of said thrust chamber assembly, and wherein the first conduit is in communication with the secondary nozzle for introducing combustion gas output from said first conduit to said secondary nozzle for providing settling thrust.

5. The rocket engine according to claim 1, wherein said first turbopump further comprises a secondary pump on the same shaft, said secondary pump comprising a kick pump.

6. The rocket engine according to claim 1, further comprising:
- a gas-generator fuel valve in the flow path of the first portion of fuel, said gas-generator fuel valve for controlling the passage of fuel to the gas-generator;
- a gas-generator oxidizer valve in the flow path of the first portion of oxidizer, said gas-generator oxidizer valve for controlling the passage of oxidizer to the gas-generator;
- a coolant control valve in the flow path of the second portion of fuel, said coolant control valve for controlling the passage of coolant to the cooling passages of said thrust chamber assembly;
- a main fuel value in the flow path of the third portion of the fuel, said main fuel valve for controlling the passage of fuel to the primary combustion chamber of said thrust chamber assembly; and
- a main oxidizer valve in the flow path of the second portion of oxidizer, said main oxidizer valve for controlling the passage of oxidizer to the primary combustion chamber of said thrust assembly.

7. The rocket engine according to claim 1, wherein the third portion of fuel is relatively larger than the first portion of fuel and the second portion of fuel, and the second portion of oxidizer is relatively larger than the first portion of oxidizer.

8. The rocket engine according to claim 6, wherein the gas-generator fuel valve and the gas-generator oxidizer valve include variable actuators for modulating the output of heated combustion has from said gas-generator.

9. The rocket engine according to claim 1, wherein each of the conduits of said heat exchanger comprises one or more tubes situated cross-wise to a flow of heated gas from said gas-generator and allowing fuel to flow within and become heated.

10. The rocket engine according to claim 1, wherein the cooling passages in said thrust chamber assembly communicate with the second conduit in said heat exchanger and the gas-generator communicates with the first conduit in said heat exchanger for transferring heat to the second portion of the fuel exiting the cooling passages in said thrust chamber assembly and flowing upstream through the second conduit in said heat exchanger, and for passing a flow of the combustion gas discharged from the gas-generator downstream through the first conduit in said heat exchanger.

11. The rocket engine according to claim 1, wherein the gas-generator is completely decoupled from the primary combustion chamber of said thrust chamber assembly.

12. The rocket according to claim 1, wherein said gas-generator includes an injector at least for purging combustion products from the gas-generator upon shut down of the rocket engine.

13. The rocket engine according to claim 6, further comprising a control module for providing an actuation sequence in said rocket engine, upon a start or restart, in which said gas-generator fuel valve and the gas-generator oxidizer valve are actuated open prior to opening the coolant control valve, main fuel valve and main oxidizer valve for igniting the gas-generator prior to igniting said primary combustion chamber for ensuring a smooth engine start transient.

14. A gas-generator augmented expander cycle rocket engine comprising:
- first turbopump means for pumping fuel;
- second turbopump means for pumping oxidizer;
- gas-generator means for combusting a portion of fuel output from said first turbopump means and oxidizer from said second turbopump means;
- a heat exchanger arranged downstream of said gas-generator means, said heat exchanger being close-coupled to said gas-generator means and having a first conduit means for receiving a heated output of gas combusted in said gas-generator means, and a second conduit means arranged adjacent to said first conduit means for transferring heat from said first conduit;
- thrust chamber assembly means comprising a primary combustion chamber means facing forward and a nozzle means facing rearward, said thrust chamber assembly means including a cooling means milled or channeled in the walls of said combustion chamber for passage of a fuel for transferring heat from said thrust chamber assembly;
- wherein an output of heated fuel from the cooling means of said thrust chamber assembly means passed through the second conduit means and is the sole means for driving the first turbopump means and the second turbopump means for the respective pumping of fuel and oxidizer.

15. The gas-generator augmented expander cycle rocket engine according to claim 14, wherein the gas combusted in the gas-generator means passes through the heat exchanger means for discharge an aft end of the nozzle means of said thrust chamber assembly means.

16. The gas-generator augmented expander cycle rocket engine according to claim 14, further comprising a secondary nozzle means for providing settling thrust, wherein the gas combusted in the gas-generator is discharged through the secondary nozzle means so as to provide settling thrust, and wherein said secondary nozzle means is relatively smaller than the nozzle means of said thrust chamber assembly means.

* * * * *